United States Patent [19]

Kirkpatrick et al.

[11] Patent Number: 4,728,255
[45] Date of Patent: Mar. 1, 1988

[54] REMOVABLE STIFFENING DISK

[75] Inventors: Ralph A. Kirkpatrick, Mason; Gerard P. Kroger, Cincinnati, both of Ohio

[73] Assignee: General Electric Company, Cincinnati, Ohio

[21] Appl. No.: 704,972

[22] Filed: Feb. 25, 1985

[51] Int. Cl.⁴ .............................................. F01D 5/26
[52] U.S. Cl. ...................................... 415/119; 74/574; 188/218 A
[58] Field of Search ............... 415/134, 219 R, 119; 60/39.31, 39.75, 39.162, 39.163; 416/189 R, 189 A, 190; 188/378, 379, 380, 218 A; 74/574

[56] References Cited

U.S. PATENT DOCUMENTS

| | | | |
|---|---|---|---|
| 1,881,723 | 10/1932 | Lee | 415/119 |
| 2,488,867 | 11/1949 | Judson | 415/136 |
| 3,313,517 | 4/1967 | Hanschke et al. | 415/134 |
| 3,314,652 | 4/1967 | Geberth et al. | 415/119 |
| 3,319,929 | 5/1967 | Lawrence et al. | 415/119 |
| 3,319,930 | 5/1967 | Howald | 415/190 |
| 3,393,436 | 7/1968 | Blackhurst et al. | 416/189 |
| 3,601,500 | 8/1971 | Palfreyman | 416/190 |
| 3,823,553 | 7/1974 | Smith | 60/39.16 |
| 4,011,718 | 3/1977 | Asplund | 60/39.31 |
| 4,032,253 | 6/1977 | Ryncosky et al. | 415/219 R |
| 4,463,553 | 8/1984 | Boudigues | 60/39.162 |

FOREIGN PATENT DOCUMENTS

| | | | |
|---|---|---|---|
| 525721 | 5/1956 | Canada | 415/119 |
| 632496 | 7/1936 | Fed. Rep. of Germany | 415/119 |
| 686393 | 12/1939 | Fed. Rep. of Germany | 415/62 |
| 3025587 | 10/1982 | Fed. Rep. of Germany | 188/380 |
| 579416 | 8/1946 | United Kingdom | 60/39.61 |
| 552433 | 3/1977 | U.S.S.R. | 415/119 |
| 819409 | 4/1981 | U.S.S.R. | 415/119 |

Primary Examiner—Robert E. Garrett
Assistant Examiner—John T. Kwon
Attorney, Agent, or Firm—Douglas S. Foote; Derek P. Lawrence

[57] ABSTRACT

A removable disk for an annular casing in a turbomachine is disclosed. The disk is coaxial with the casing and slideably engagable with the casing in ambient conditions. The disk radially contacts the casing during operation so as to provide increased stiffness to the casing.

8 Claims, 5 Drawing Figures

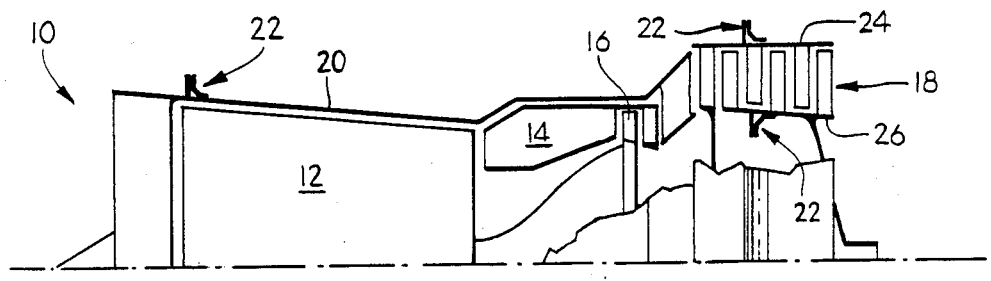
Fig 1
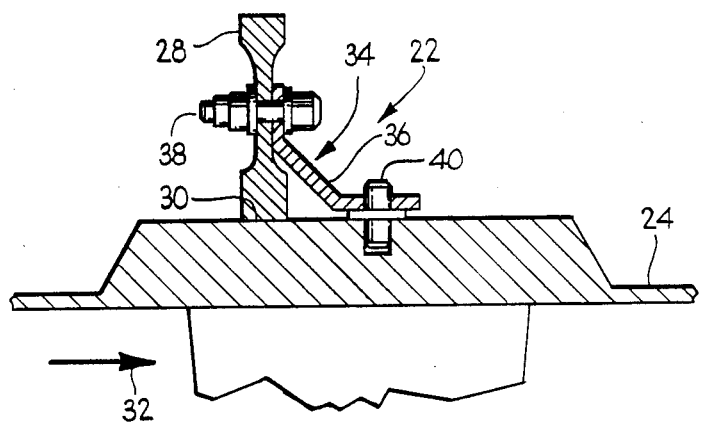
Fig 2
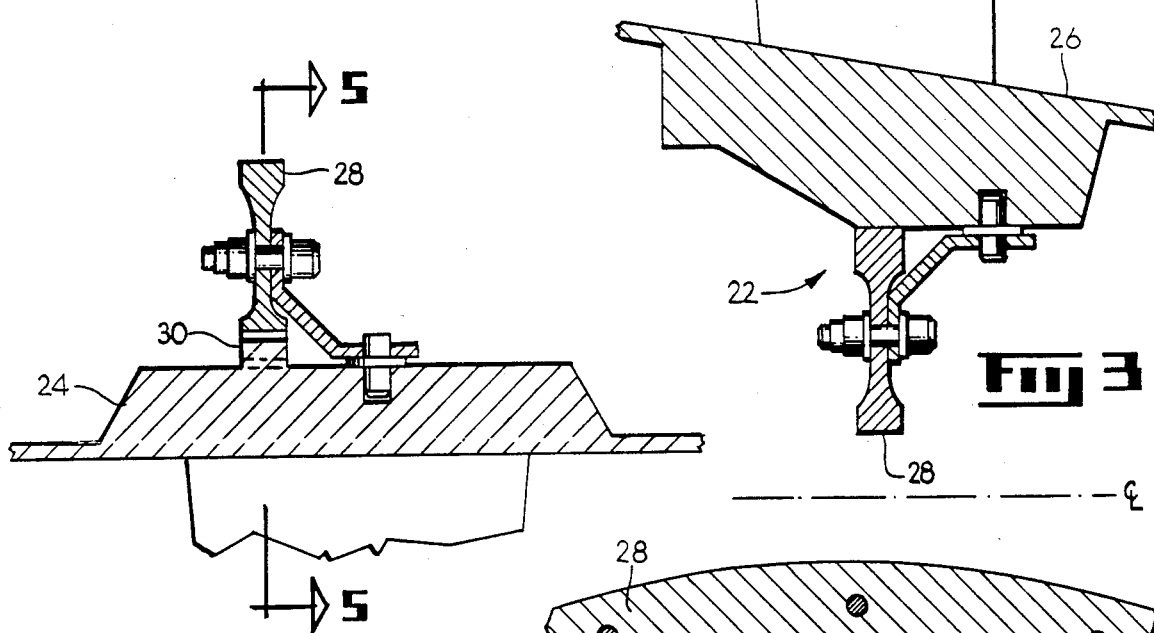
Fig 3
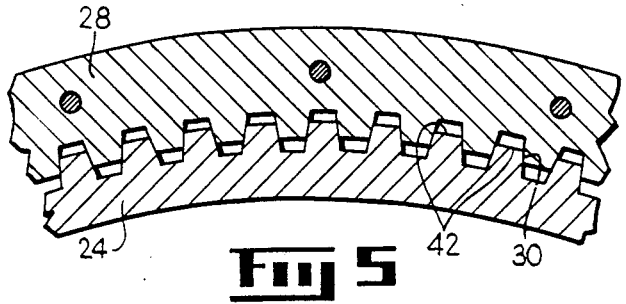
Fig 4
Fig 5

REMOVABLE STIFFENING DISK

This invention relates generally to turbomachinery and, more particularly, to means for stiffening annular structures within such turbomachinery.

The invention described herein was made in the performance of work under NASA Contract No. NAS3-24210 and is subject to the provisions of Section 305 of the National Aeronautics and Space Act of 1958 (72 Stat. 435; 42 U.S.C. 2457).

BACKGROUND OF THE INVENTION

Gas turbine engines generally include a gas generator comprising: a compressor section with one or more compressors for compressing air flowing through the engine; a combustor in which fuel is mixed with the compressed air and ignited to form a high energy gas stream; and a turbine section which includes one or more rotors for driving the compressor(s). Many engines further include an additional turbine section, known as a power turbine, located aft of the gas generator which extracts energy from the gas flow out of the gas generator to drive an external device such as a fan or a propeller.

Each of the turbines and compressors include components which are generally cylindrical or conical in shape. For example, the annular flowpath through both the compressor and the turbine is bounded by radially inner and outer casings. These casings may be static or rotating, and may or may not support blade rows.

Such components are subject to vibration during engine operation. More particularly, each component is subject to nodal diameter vibration. Nodal diameter vibration is characterized by two or more points (nodes) on the circumference of the annular structure remaining fixed while points between the nodes undulate back and forth.

Annular components tend to vibrate at a natural or resonant frequency. When these components are subjected to an excitation source vibrating at the resonant freqeuncy of the component, the component may fail. Although such failures rarely occur, a more typical problem is the secondary structural damage which may result from rubs between rotating and stationary parts. High performance gas turbine engines require close tolerances be maintained between, for example, rotating blades and the surrounding casing. If the casing vibrates, an interference or rub between the surfaces may occur. Such rubs create gaps which deteriorate engine performance.

The frequency of nodal vibration may be raised to avoid resonance by stiffening the annular components. Such stiffening may be achieved by increasing the thickness of the components. However, this can result in excessive weight and resulting performance penalties. Alternatively, a relatively narrow axial portion can be thickened by a flange-like arrangement. For example, where two annular members are joined, the connecting flange will function as a stiffening member.

In many gas turbine engine designs, there is limited space between the outer casing and surrounding nacelle or outer structure. In these engines, flanges reduce the radial space available for other components to pass therethrough.

OBJECTS OF THE INVENTION

It is an object of the present invention to provide a new and improved means for increasing stiffness of an annular casing in a turbomachine.

It is another object of the present invention to provide a new and improved means for stiffening an annular casing with minimum weight and maximum accessiblity of other components during assembly.

SUMMARY OF THE INVENTION

The present invention is a removable disk for an annular casing in a turbomachine. The disk radially contacts the casing during operation so as to provide increased stiffness to the casing.

An alternative form of the present invention is a removable stiffening member for an annular casing in a turbomachine. The stiffening member comprises a disk adapted to contact the casing during operation and positioning means for axially positioning the disk with respect to the casing.

BRIEF DESCRIPTION OF THE DRAWINGS

FIG. 1 is a schematic view of a gas turbine engine embodying the present invention.

FIG. 2 is a more detailed view of an outer casing of a gas turbine engine embodying the present invention.

FIG. 3 is a view of an inner casing of a gas turbine engine embodying the present invention.

FIG. 4 is a view similar to FIG. 2 according to an alternative form of the present invention.

FIG. 5 is a view taken along the lines 5—5 in FIG. 4.

DETAILED DESCRIPTION OF THE INVENTION

FIG. 1 is a schematic of a gas turbine engine which embodies the present invention. Although a gas trubine engine is disclosed, the invention applies equally to any turbomachine. Engine 10 includes a compressor 12, a combustor 14, and a turbine 16 in serial flow relationship. Aft of turbine 16 is a second turbine or power turbine 18. A stationary annular casing 20 is disposed radially outwardly of compressor 12. A removable stiffening member 22, according to one form of the present invention, is positioned thereon. As shown, power turbine 18 is counterrotating with outer rotating annular casing 24 and inner rotating annular casing 26. Disposed on each casing 24 and 26 is a removable stiffening member 22. It will be clear that FIG. 1 is shown of illustrative purposes only and that removable stiffening members 22 may be applied to any annular casing within a gas turbine engine where stiffening is required.

FIG. 2 shows in greater detail a removable stiffening member 22 for an annular casing 24. Stiffening member 22 incluces a removable disk 28. Removable disk 28 is coaxial with casing 24 and slideably engagable with casing 24 at interface 30 at ambient conditions. "Ambient conditions" refers to temperatures and pressures experienced by an engine when not in operation. Disk 28 radially contacts casing 24 at interface 30 during engine operation so as to provide radial support and increased stiffness to casing 24. This occurs because the relatively thin casing 24 is exposed to hot gases in flowpath 32 and thereby expands radially into the radially thicker and generally cooler disk 28. By proper selection of materials and sizing of casing 24 and disk 28, a friction fit at interface 30 during engine operation may be achieved to provide a desired stiffness.

Stiffening member 22 also includes positioning means 34 for axially positioning disk 28 with respect to casing 24. Positioning means 34 includes a bracket 36, first fastening means 38, and second fastening means 40. First fastening means 38 removably attaches bracket 36 to disk 28 and may, for example, include an axially directed bolt. Second fastening means 40 is effective for removably attaching bracket 36 to casing 24 and may, for example, include a retention pin for axially and circumferentially retaining bracket 36.

Positioning means 34 primarily provides axial and circumferential location of disk 28 during assembly. During periods of operation, disk 28 contacts casing 24 in a manner that provides circumferential and axial support and restraint of disk 28.

FIG. 3 shows an alternative embodiment of the present invention wherein stiffening member 22 is removably connected to an inner casing 26. Stiffening member 22 is similar to that described in FIG. 2. However, casing 26 will tend to grow radially outwardly during operation. In order to stiffening member 22 to provide radial support for casing 26 during operation, it will be necessary to select a material for disk 28 with a higher coefficient of thermal expansion sufficiently greater than casing 26 so that even in a cooler environment it will expand radially outwardly faster than casing 26.

FIG. 4 shows an alternative embodiment of the present invention wherein interface 30 between disk 28 and casing 24 includes a plurality of meshed axially directed splines 42 on casing 24 and disk 28, respectively. This supplies additional circumferential restraint of casing 24 thereby reducing nodal diameter vibration.

It will be clear to those skilled in the art that the present invention is not limited to the specific embodiments described and illustrated herein. Nor, is it limited to removable stiffening members on turbine casings. Rather, it applies equally to such members on compressor casings and other annular rotating and static annular members.

It will be understood that the dimensions and proportional and structural relationships shown in these drawings are by way of example only, and these illustrations are not to be taken as the actual dimensions or proportional structural relationships used in the removable stiffening disk of the present invention.

Numerous modifications, variations, and full and partial equivalents can now be undertaken without departing from the invention as limited only by the spirit and scope of the appended claims.

What is desired to be secured by Letters Patent of the United States is the following.

What is claimed is:

1. A removable stiffening member for an annular casing in a turbomachine comprising a substantially rigid disk coaxial and slideably engagable with said casing at ambient conditions, wherein said disk radially contacts said casing during turbomachine operation generally continuously along an entire circumferential surface of said casing so as to provide circumferential and axial restraint of said disk and increased stiffness to said casing.

2. The removable stiffening member of claim 1, wherein said stiffening member includes positioning means for axially positioning said disk with respect to said casing.

3. A removable stiffening member for an annular casing in a turbomachine, comprising:
   a substantially rigid annular disk adapted to contact said casing during turbomachine operation at a multiplicity of diametrically opposed locations so as to provide circumferential and axial restraint of said disk and to provide radial support and stiffness to said casing;
   a bracket for axially positioning said disk;
   first fastening means for removably attaching said bracket to said disk; and
   second fastening means for removably attaching said bracket to said casing.

4. A member, as recited in claim 3, wherein said second fastening means includes a retention pin for axially and circumferentially retaining said bracket.

5. A member, as recited in claim 3, wherein said first fastening means includes an axially directed bolt.

6. A member, as recited in claim 3, wherein said disk contacts said casing through a plurality of meshed axially directed splines on said casing and said disk.

7. A removable, substantially rigid disk adapted to contact an annular casing in a turbomachine, wherein said disk radially contacts said casing generally continuously along the entire inner circumferential surface of said casing so as to provide increased stiffness to said casing.

8. A turbomachine including:
   an annular casing, said casing having a natural resonant frequency of vibration; and
   a substantially rigid stiffening member adapted to contact said casing during turbomachine operation at a multiplicity of diametrically opposed locations, wherein said stiffening member is effective for raising said resonant frequency so as to avoid resonant frequency vibration of said casing during turbomachine operation.

* * * * *